United States Patent [19]

Harthoorn

[11] Patent Number: 4,707,974
[45] Date of Patent: Nov. 24, 1987

[54] METHOD AND APPARATUS FOR REDUCING ENTRAPMENT OF A CROP MATERIAL IN A ROUND CROP BALER

[75] Inventor: Carroll L. Harthoorn, Pella, Iowa

[73] Assignee: Vermeer Manufacturing Co., Pella, Iowa

[21] Appl. No.: 812,460

[22] Filed: Dec. 23, 1985

[51] Int. Cl.⁴ ............................................. A01D 39/00
[52] U.S. Cl. ......................................... 56/341; 100/88
[58] Field of Search ................. 56/341, 364; 100/88; 198/839

[56] References Cited

U.S. PATENT DOCUMENTS

| 2,732,058 | 1/1956 | Nigru et al. | 198/839 |
| 2,784,834 | 3/1957 | Trinkle | 198/839 |
| 3,139,970 | 7/1964 | Mordstein | 198/839 |
| 3,931,702 | 1/1976 | Soteropulos et al. | 56/341 |
| 3,992,987 | 11/1976 | Sereg | 56/341 |
| 4,224,867 | 9/1980 | Gueddert et al. | 56/341 |

FOREIGN PATENT DOCUMENTS

| 1021197 | 11/1977 | Canada | 56/341 |
| 0125719 | 11/1984 | European Pat. Off. | 56/341 |
| 2419488 | 11/1974 | Fed. Rep. of Germany | 56/341 |

Primary Examiner—Stephen J. Novosad
Assistant Examiner—William P. Neuder
Attorney, Agent, or Firm—Rudolph L. Lowell

[57] ABSTRACT

The baler has a plurality of rolls and belts defining an expandable bale forming chamber. Preselected belt sections extended between an adjacent pair of the rolls and movable in a path out of engagement with the bale being formed in the chamber are provided with a twist of about 180°. Any loose crop material carried by a belt is released and dropped from the belt on travel of the preselected belt section between the adjacent pair of rollers.

3 Claims, 4 Drawing Figures

METHOD AND APPARATUS FOR REDUCING ENTRAPMENT OF A CROP MATERIAL IN A ROUND CROP BALER

BACKGROUND OF THE INVENTION

Round crop balers now in common use, and to which this invention is applicable, generally include a plurality of rolls, flat belts and baler side walls to define an expandable bale forming chamber having a crop inlet. One of the problems in this type baler is the tendency of loose crop material being trapped inside the belts and then carried by the belts for entrapment between the belts or between the belts and the baler elements adjacent the belts or for wrapping around the rolls. This entrapment and wrapping of the crop material requires frequent stops by the baler operator to remove such material in order to maintain proper baler operation and to prevent baler damage.

In U.S. Pat. No. 4,399,746 the belts, at a preselected location in the baler are supported on staggered rolls in a manner to provide openings between the rolls and certain of the belts for the escape therethrough of loose crop material that may tend to become entrapped on a baler element or wrapped around the rolls.

U.S. Pat. No. 3,979,892 discloses a roll scraping element in combination with finger elements projected between adjacent belts to remove any material tending to travel with the belts.

SUMMARY OF THE INVENTION

This invention substantially eliminates the wrapping or entrapment of any loose material traveling on the belts with the use of only one additional roll. A pair of vertically spaced front rolls are located forwardly of the crop inlet to the bale forming chamber and forwardly of a bale in a bale forming operation. Each belt section located between these front rolls is formed with about a 180° twist so as to increase the transverse spacing between the belts over such belt sections. By virtue of the twisting action of the belts in their travel between the vertically spaced front rolls and the enlarged openings formed between the adjacent twisted belt sections, any loose crop material traveling with the belts is released and dropped into the material entering the crop inlet.

DESCRIPTION OF A PREFERRED EMBODIMENT

Figure 1:
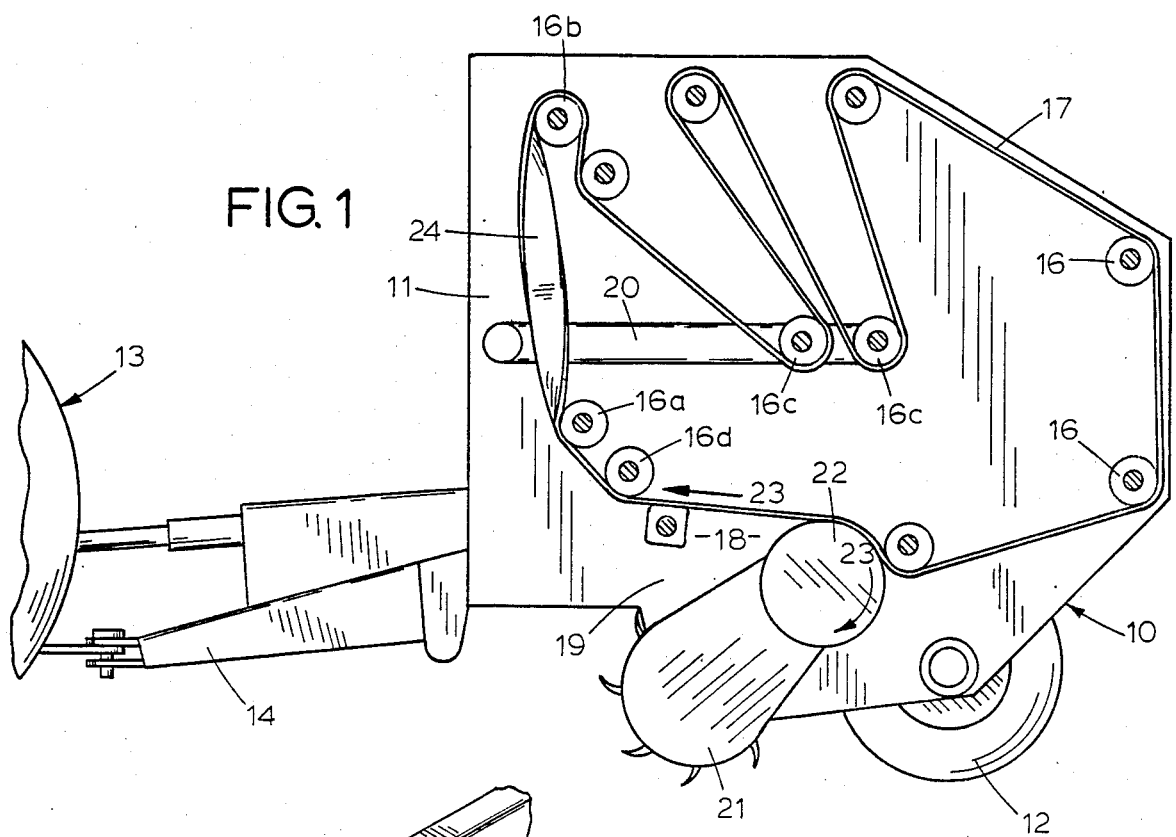
FIG. 1 is a diagrammatic side elevational view of a generally typical round baker with an inner side wall removed to show the interior elements of the baler.

Referring to FIG. 1, there is illustrated a baler representative of typical round balers now commercially available that includes a supporting frame structure 10 having a pair of transversely spaced upright side walls 11 only one of which is shown. The baler machine is carried on wheels 12 (one shown) and is drawn behind a tractor indicated at 13 by a draft tongue 14. A plurality of belt supporting rolls 16 extend between and are suitably journaled in the side walls 11 and include front upper roll 16b and a front lower roll 16d. A plurality of belts 17 trained about the rolls 16, 16b and 16d provide a bale forming chamber 18 having a bottom crop inlet 19 to receive crops from a pick up mechanism 21.

Crops introduced into the inlet 19 are rolled by action of the belts 17 and a rotatable bale supporting cylinder 22 to form an initial core for the bale to be formed in the chamber 18, with certain of the rolls indicated at 16c being carried on pivotally movable tension arms 20 to enable the bale forming chamber to progressively expand to accommodate the increasing diameter of the cylindrical bale being formed. The core of the bale results from the oppositely moving stretches of the belts relative to the direction of rotation of the supporting cylinder 22 with this reversed directional movement being indicated by arrows 23. For a further detail description of the bale forming operation, reference is made to U.S. Pat. No. 4,172,354.

In balers of this general type, and as previously noted, there is encountered the problem of the crop material becoming entrapped in the baler elements adjacent the front rolls 16b and 16d or in becoming wrapped about the rolls 16b and 16d. In accordance with this invention an additional roll 16a is located forwardly and upwardly from the lower roll 16d in a vertically spaced relation with and below the upper roll 16b. The belt sections 24 that extend between the front rolls 16a and 16b are assembled to permit any crop material that may be carried on such sections being dropped downwardly into the crop windrow 25 (FIG. 3) or on the pick up mechanism 21 for entry into the bale forming chamber 18. In this respect, it is to be noted that the pick up mechanism 21 is located below and rearwardly of the front rolls 16a and 16b.

Figure 2:
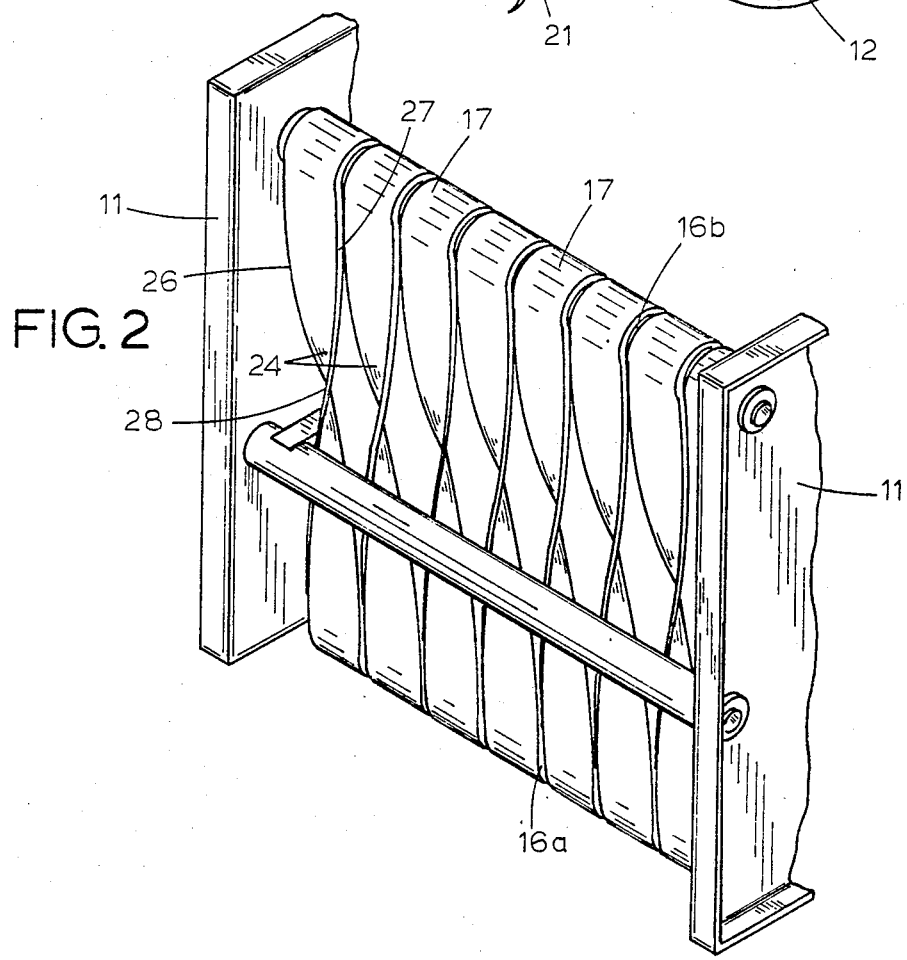
FIG. 2 is a fragmentary front view showing the improved belt and roller assembly of the baler in FIG. 1.

As shown in FIGS. 1 and 2, the belt sections 24 between the spaced rolls 16a and 16b are formed with a 180° twist. However, in some instances only selected ones of the belt sections 24 need be formed with a twist. As a result of this belt twisting construction, it has been found that any crop material on the belts is ejected or released at the sections 24 for dropping downwardly therefrom and forwardly of or onto the pick up mechanism 21. In one embodiment of the invention the belts 17 are six and one-half inches wide and spaced transversely apart a distance of about three-quarters of an inch. As the twisted belts (FIG. 2) travel between the rolls 16a and 16b, their side edges 26 move in a rearward and lateral direction concurrently with the movement of their side edges 27 in a forward and laterally reversed direction relative to the side edges 26 so that the edges 26 and 27 cross each other at the central portions 28 of the 180° twist in the sections 24. By virtue of this twist travel, the central portions 28 of the adjacent twisted belt sections 24 are transversely spaced a distance apart of about seven and one-quarter inches and the central portions of an adjacent twisted section and non-twisted section a distance apart of about four inches. As a result the side edges 26 and 27 of adjacent twisted belts 17 although initially transversely spaced three-quarters of an inch apart move in laterally opposite directions so that at the central portions 28 of the 180° belt twist, the side edges 26 face rearwardly and the side edges 27 face forwardly. It is seen, therefore, that adjacent belt edges 26 and 27 are moved apart from each other in the 180° belt twist so as to release crop material on the belts by exerting a pulling apart or ejecting action on any crop material carried on the belts or extended across the spacing between the belts.

Figure 3:
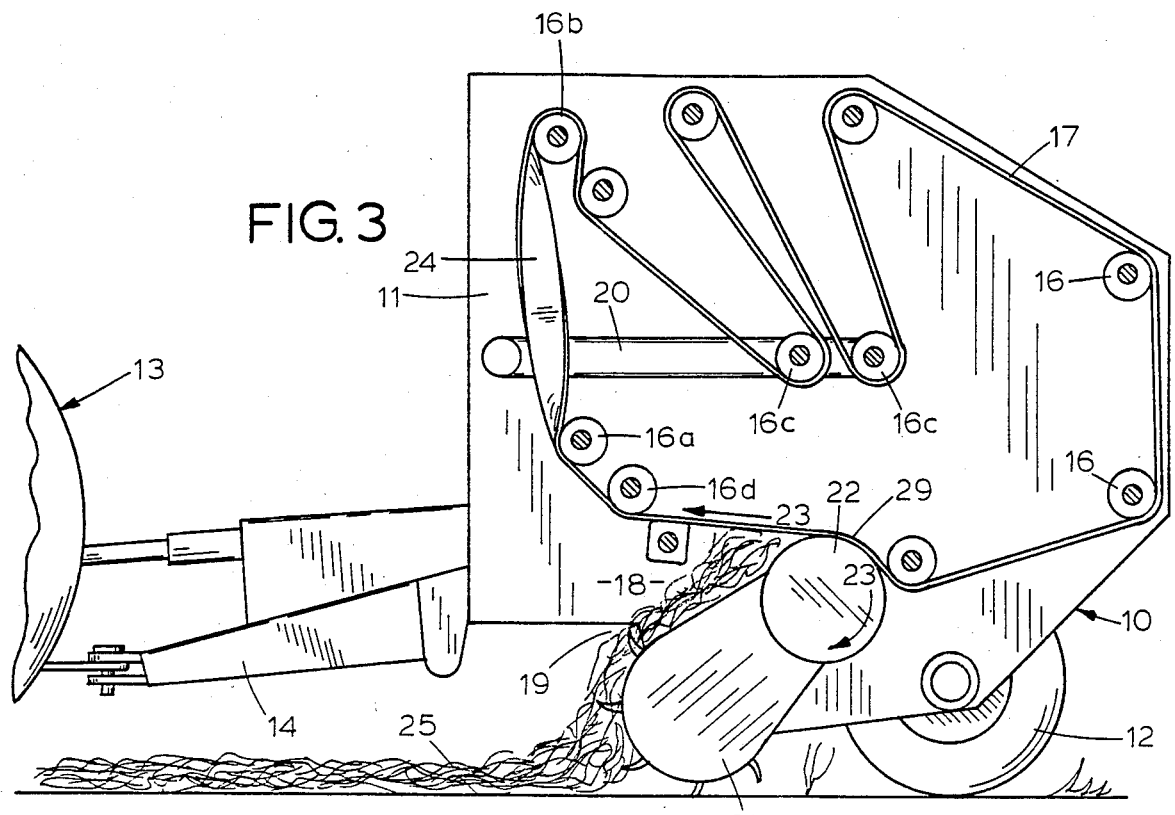
FIG. 3 is illustrated similarly to FIG. 1 and shows the start of a bale forming operation.
Figure 4:
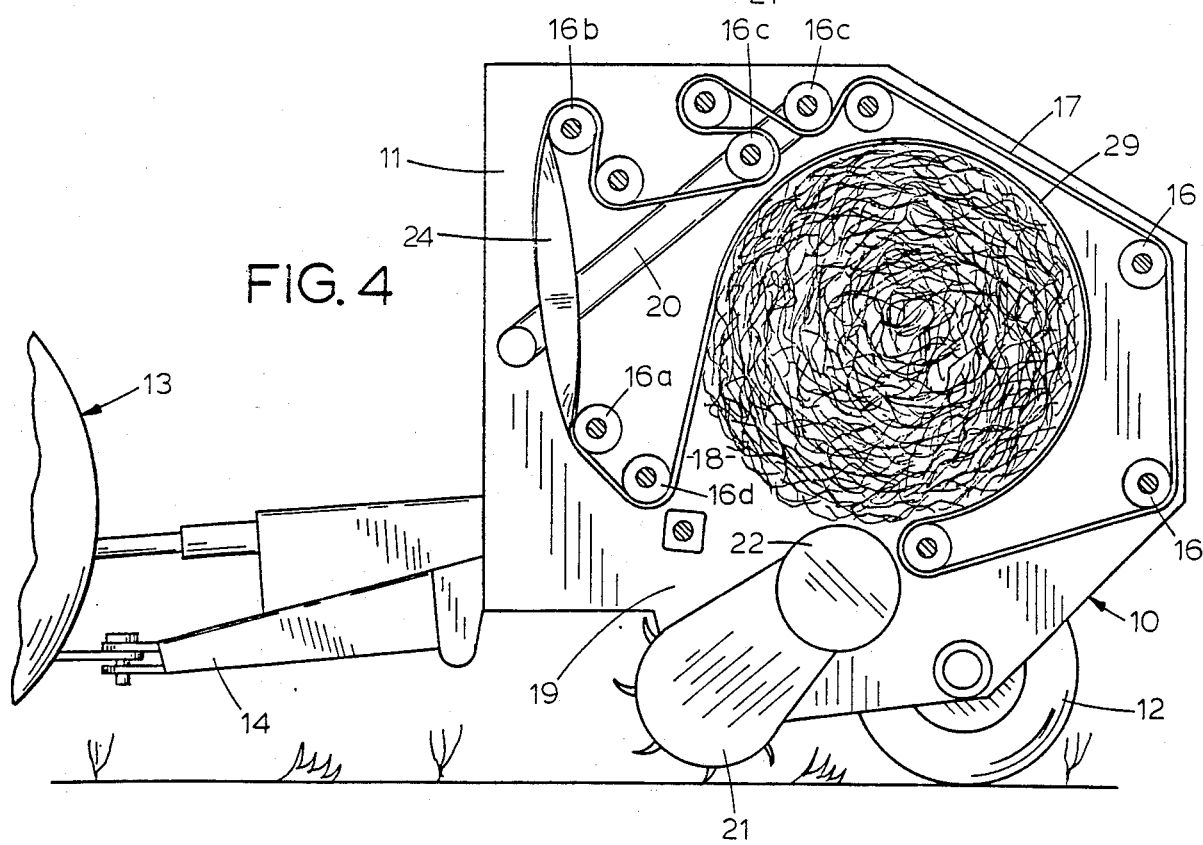
FIG. 4 is illustrated similarly to FIG. 3 and shows parts thereof in changed positions at the completion of a bale forming operation.

This release of crop material from the belt sections 24 takes place at all times during the bale forming operation since the additional roll 16a provides for the sections 24 always being in a clearance relation with those portions of the belts 17 that are directly engageable with the bale being fomed. Thus, as shown in FIG. 3, when a baling operation is initiated the core forming belt sections 29 extend substantially horizontally in a direction below and rearwardly of the belt sections 24. On completion of the bale, (FIG. 4), the expanded belt sections 29 extend upwardly and rearwardly in a spaced relation away from the belt sections 24. As a result there is no interference or contact of the belt sections 24 with the belt sections 29 in the release or ejection of crop material from the sections 24. It is seen, therefore, that the problems of crop material entrapment or roll wrapping have been substantially eliminated by constructing the baler belts in a manner to release any crop material being carried thereon.

Although the invention has been described with respect to a preferred embodiment thereof, it is to be understood that it is not to be so limited since changes and modifications can be made therein which are within the full intendes scope of this invention as defined by the appended claims.

I claim:

1. In a round baler machine including:
   (1) a pair of upright transversely spaced side walls,
   (2) a plurality of rolls supported by said side walls including a pair of vertically spaced front rolls,
   (3) a plurality of transversely spaced flat belts supported by said rolls having bale engaging sections which define an expandable bale forming chamber means having a crop material inlet, and
   (4) a crop material pick up means below said pair of front rolls for feeding crop material into said inlet; the improvement wherein:
   (a) said pair of front rolls are located forwardly of and spaced from said chamber means, and said belts have upright sections extended between said pair of front rolls, with selected upright sections having a portion thereof formed with a twist of about 180° to provide an opening with an adjacent upright section whereby any stray crop material in the space between said upright belt sections and chamber means is carried by the belts to be discharged through an opening and dropped downwardly onto the crop material being fed into said inlet by the crop pick up means.

2. The round baler machine according to claim 1, including:
   (a) a bottom roll located below and rearwardly of the lower one of said pair of vertically spaced front rolls whereby said bale engaging belt sections, on expansion of said bale forming chamber means, are extended upwardly from said bottom roll at positions rearwardly of said upright belt sections to maintain the spaced relation between said upright belt sections and chamber means.

3. The method for removing stray crop material from flat belts of a round crop baler wherein the baler includes a pair of upright transversely spaced side walls and a plurality of rolls mounted on the side walls for supporting and moving the belts to define an expandable bale forming chamber means having a crop inlet for receiving crop material from a pick up means, comprising the steps of:
   (a) positioning a pair of said rolls in a vertical spaced relation for movement therebetween of upright belt sections that are out of engagement with bale engaging belt sections that define said chamber means,
   (b) locating said pair of rolls in a vertically spaced relation forwardly of and above said crop pick up means, and
   (c) forming selected ones of said upright belt sections with a twist of about 180°.

* * * * *